United States Patent

Ban

[15] 3,697,085

[45] Oct. 10, 1972

[54] TAPE CARTRIDGE POSITIONING APPARATUS

[72] Inventor: Itsuki Ban, 829 Higoshi-Oizumimochi, Tokyo-to, Japan

[22] Filed: Dec. 22, 1970

[21] Appl. No.: 100,561

[52] U.S. Cl. ....................274/4 B

[51] Int. Cl. ....................G11b 23/04

[58] Field of Search....................274/4 B, 4 F, 11 B; 179/100.2 Z

[56] References Cited

UNITED STATES PATENTS 3,540,738 11/1970 Yamamoto et al..179/100.2 Z

*Primary Examiner*—Harry N. Haroian

*Attorney*—Jacobs & Jacobs

[57] ABSTRACT

A tape cartridge positioning apparatus for an endless magnetic tape cartridge player, which comprises a reciprocating lever member slidably provided on a deck in a player so as to be transverse to a direction that the tape cartridge is laterally inserted into the player housing and adapted to be urged by a tension spring in one direction, a stopper means retaining the lever member in a first portion where the cartridge to be inserted into the player housing is interposed between a rear arm parallel with a front arm on the lever member, a first guide member movably provided on the lever member and adapted to be urged by a spring, and a second guide member movably provided on the deck and adapted to be urged by a spring. The stopper is disengaged from the lever member in conjunction with the insertion of the cartridge into the player housing whereby the lever member is moved from the first position to a second position by the bias of the tension spring. The cartridge is movably advanced by pressing its rear edge by the rear arm when the lever member is moved to the second position. The first and second guide members serve to guide the cartridge when inserted into the player housing and to press the side wall of the cartridge under influence of the springs when moved to the play position thereby positioning the same in the play position in association with the lever member.

8 Claims, 3 Drawing Figures

TAPE CARTRIDGE POSITIONING APPARATUS

BACKGROUND OF THE INVENTION

This invention relates to an endless magnetic tape cartridge player, and more particularly to a novel and improved tape cartridge positioning apparatus for positioning an endless magnetic tape cartridge to be inserted into the player in the play position.

In the conventional tape cartridge player, the endless magnetic tape cartridge is longitudinally inserted and positioned in the play position when a spring biased retention roller is received in a notch formed in the cartridge side wall. Disadvantages derived from the use of such prior player are that the cartridge is not properly positioned in the play position to allow the running speed of the tape in the cartridge to be unstable causing wow-flatter aspect, for instance since the inclined wall of the notch is not properly pressed by the retention roller and the retention roller is improperly located. Interchangeability of the cartridge to be used is obstructed due to limited and specific notch located in the cartridge. Further, the player of the tape which receives the cartridge longitudinally therein is intended to accumulate dust and dirt in its innermost area due to location of the magnetic head so that such dust and dirt can not be wiped out unless a specific tool is used.

The inventor has proposed and disclosed the way that the tape cartridge is laterally inserted into the player housing for positioning the tape cartridge in the play position, by which defects produced in the conventional tape cartridge positioning apparatus. These are, for instance, shown in U.S. Pat. application Ser. No. 879,870 filed on Nov. 25, 1969, now U.S. Pat. No. 3,603,743, U.S. Pat. application Ser. No. 885,476 filed on Dec. 16, 1969 now Pat. No. 3604862, U.S. Pat. application Ser. No. 887,195 filed on Dec. 22, 1969, U.S. Pat. application Ser. No. 242 filed on Jan. 2, 1970, now U.S. Pat. No. 3,630,528, U.S. Pat. application Ser. No. 34,737 filed on May 5, 1970, now U.S. Pat. No. 3,633,920, and U.S. Pat. application Ser. No. 34,825 filed on May 5, 1970. The inventor for the subject application has succeeded, in addition to those applications above listed, in obtaining a novel tape cartridge positioning apparatus arrangement by which insertion of the cartridge is smoothly made and stably positioned in the play position.

SUMMARY OF THE INVENTION

It is a primary object of the invention to provide a tape cartridge positioning apparatus for positioning the tape cartridge in the play position without relying on a notch formed in the side wall of the tape cartridge.

Another object of the invention is to provide a tape cartridge positioning apparatus by which the cartridge is automatically moved in the direction transversely of the direction when inserted by a reciprocating lever member and is positioned in the play position upon laterally insertion of the cartridge into the player housing.

A further object of the invention is to provide a tape cartridge positioning apparatus wherein there is provided a first guide member on the lever member adapted to slide and biased by a spring, and a second guide member on the deck in the player housing adapted to slide and biased by a spring, the cartridge being smoothly inserted in the player housing when guided by these guide members.

Still further object of the invention is to provide a tape cartridge positioning apparatus wherein the cartridge which is moved to the play position by the lever member is pressed at its side wall by the first and second guide members under the bias of the spring, the cartridge being then positively and stably positioned in the play position.

Yet another object of the invention is to provide a tape cartridge positioning apparatus wherein the lever member is automatically disengaged in conjunction with insertion of the cartridge, the cartridge being moved from a first position to a second position for positioning it in the play position by the bias of a tension spring, the cartridge being manually moved from the second position to the first position against the bias of the tension spring, the cartridge being adapted to be automatically taken out of the player housing when the lever member is retained.

According to the present invention, a magnetic head for transducing the tape within the cartridge can be located adjacent the opening formed in the player housing to receive the tape cartridge therein to enable the users to readily check and clear up the dirt and dust.

Other object and advantages will become apparent from the following description of the exemplary embodiment of the invention illustrated in the drawings, in which:

DESCRIPTION OF THE PREFERRED EMBODIMENTS

Figure 1:
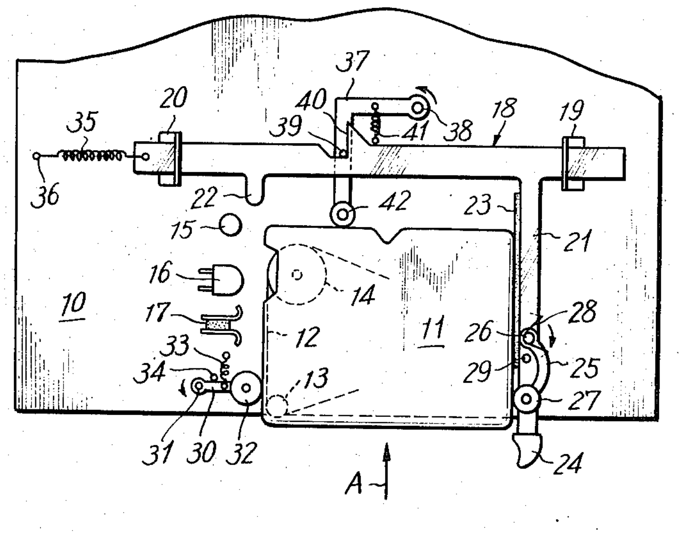
FIG. 1 is a representation schematically showing an embodiment of a tape cartridge positioning apparatus according to the invention.

Referring now to the drawings, and in particularly to FIG. 1, the reference numeral 10 is a horizontal deck which is provided within a player housing (not shown) for a tape cartridge player and on which is mounted an endless magnetic tape cartridge 11 inserted for play into an opening or window (not shown) formed in the housing, and a tape cartridge positioning apparatus, as will be detailed later, according to the invention.

The cartridge 11 includes a generally rectangular housing with a centrally disposed reel (not shown) on which an endless magnetic tape 12 is wound and unwound in conventional manner. The tape 12 passes over a guide 13 and a pinch roller 14. The guide 13 and pinch roller 14 are displaced adjacent the leading edge of the cartridge whereat the cartridge side wall is cut away or dispensed with and the tape 12 is extended from the center of the hub of the reel (not shown) about the guide 13 and thence about the pinch roller 14 back to outer periphery of a roll formed by the tape wound about the hub.

Much of the mechanism disposed beneath the deck 10 is omitted since it forms no part of the present invention. However, there is shown on the deck 10 a capstan 15 for driving the tape 12 within the cartridge 11 in a play position, a magnetic head 16 adapted to transduce the tape and an endmark detector 17. The capstan 15 is rotatably supported by a suitable bearing (not shown) mounted below the deck 10 and extends through a hole (not shown) bored through the deck upwardly of the deck, and is adapted to be rotatably driven by an electrical motor (not shown). The endmark detector 18 includes a pair of electrically separated feeler contacts which are shorted by a conductive patch (not shown) on the tape 12.

The tape cartridge positioning apparatus seconding to the present invention includes a reciprocating lever member 18 slidably supported by guides 19 and 20 fixed to the deck 10. The lever member 18 is provided for moving the cartridge 11 which is inserted in the player housing from the direction of arrow A and is laid on the deck 10 toward the play position where the pinch roller 14 within the cartridge abuts against the capstan 15. The lever member 18 includes a relatively longer rear arm 21 and a relatively shorter front arm 22 in parallel therewith so as to have a space longer than the longitudinal length of the cartridge 11. The rear arm 21 includes a bent portion 23 upwardly bent at one edge opposed to the front arm 22. The end of the rear arm with which the knob is provided project through an opening (not shown), and then extends forwardly of the player housing. A lever 25 is pivotally mounted to a pin 26 on the rear arm 21. A guide roller 27 is rotatably mounted to the lever 25 at free end thereof. Although Although the lever 25 is clockwise biased by a spring 28 as shown by arrow, movement of the lever 25 by the bias of the spring 28 is controlled by a stopper pin 29. In this condition, a portion of the roller 29 slightly projects from the inside edge thereof.

A lever 30 includes at its free end a guide roller 32 similar to the guide roller 27 and is slidably mounted to a pin 31 on the deck 10 adjacent the opening formed in the player housing. The lever 30 is counterclockwise biased by a spring 33 in the direction of arrow, but its movement is limited by a stopper pin 34. A comparatively heavy tension spring 35 is interposed between an end portion of the lever member 18 and a pin 36 mounted on the deck 10 to normally urged the lever member in the leftward direction. Movement of the lever member 18 under the bias of the tension spring 35 is arrested at a first position as shown in FIG. 1 by engagement of a pin 39 which is on a substantially L-shaped stopper lever 37 pivotally mounted to an axis 38 on the deck 10, with a stepped portion 40 of the lever member 18 when the cartridge 11 is not inserted into the player housing. The stopper lever 37 is biased in the counterclockwise direction by a spring 49, but its inward movement is limited by the lever member 18. The stopper lever 37 has one end passing through clearance between the deck 10 and the lever member 18 and forwardly extending. A relatively thin roller 42 is mounted to the stopper lever 37 at one end thereof. Mode of operation of the tape cartridge positioning apparatus according to the present invention in FIG. 1 will be apparent from the following description.

When the cartridge 11 is transversely inserted through the opening in the player housing into the housing (not shown), it is smoothly inserted thereinto as guided by the guide rollers 27, 32. The distance between the guide rollers 27 and 32 is somewhat narrower than the longitudinal length of the cartridge 11 so that the roller 27 is depressed by the rear wall of the cartridge to allow insertion of the cartridge against the bias of the spring 28. When the cartridge 11 is moved to the position as shown in FIG. 1 and then depressedly inserted thereinto by hand in the direction of arrow A, the roller 42 is pressed by the side wall of the cartridge and the stopper lever 37 is clockwise pivoted against the bias of the spring 41. When the cartridge 11 is inserted until the side wall thereof abuts against the lever member 18, the stopper lever 37 is swung to the position where the pin 39 on the stopper lever is disengaged from the step portion 40. As a result, the lever member 18 is disengaged from the stopper lever 37 and slided leftwardly by the bias of the tension spring 35. At this moment, the cartridge 11 is forwardly moved as the rear wall thereof is urged by the rear arm 21. The guide roller 32 is moved by one corner of the leading edge of the cartridge against the bias of the spring 33 to allow the guide roller 32 to abut against the side wall of the cartridge, and thereby guiding the cartridge 11. Movement of the cartridge 11 to the play position where the pinch roller 14 in the cartridge abuts against the capstan 15, prevents further movement of the cartridge and the lever 18 so that the lever member 18 is retained in a second position.

Figure 2:
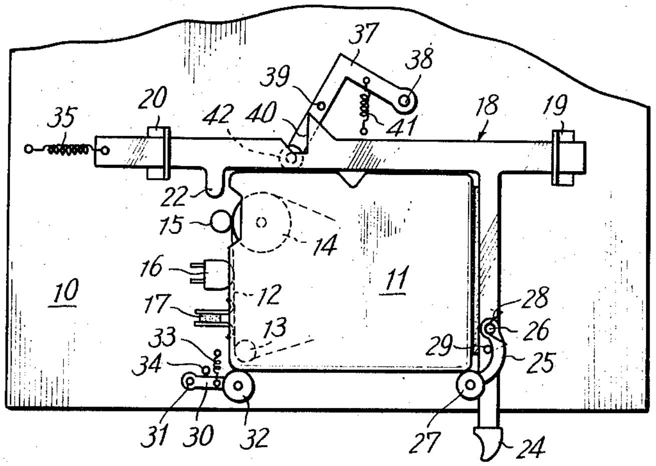
FIG. 2 is a representation showing each component of the tape cartridge positioning apparatus of FIG. 1 where the tape cartridge is positioned in the play position.

If the cartridge 11 is inserted in the direction of arrow A into the position where one side wall of the cartridge abuts against the lever member 18, the guide roller 27 is disconnect to the rear wall of the cartridge and is clockwise and movably returned by the bias of the spring 28 and then contacts the other side wall of the cartridge under the influence of the spring 28. Accordingly, the cartridge 11 which is moved to the play position, can be securely and positively positioned in the play position since it ensures and maintains a relative position to the capstan 15, the magnetic head 16, and the end-mark detector 17 by means of the lever member 18 and the guide rollers 27, 32. Each of components of the apparatus when the cartridge 11 is positioned in the play position is shown in FIG. 2. Where the cartridge 11 is positioned, the pressure force derived from the pinch roller 14 and the capstan 15 is given by the bias of the tension spring 15 while the tape 12 is drivingly transported across the magnetic head 16 in association with the pinch roller 14 and the capstan 15 and thus is reproduced.

If it is desired to suspend the play of the cartridge 11 in the play position, the knob 24 of the lever 18 is taken by fingers and rightward moved against the bias of the tension spring 35. With this movement of the lever member 18, the leading edge of the cartridge 11 is depressed by the front arm 22 and is then moved back. Movement of the lever 18 to the first position moves the stopper lever 37 by the bias of the spring 41 to the position where the pin 39 on the lever 37 engages the step portion 40 at which time the side wall of the cartridge 11 is depressed by the roller 42 on the stopper lever 37 and is moved in the direction reversed to the direction of arrow A. At this time, each component of the apparatus assumes the same position as shown in FIG. 1. If the knob is taken off from the fingers, the lever member 18 can be retained in the first position as the stopper lever 37 is returned to its original position.

Thus, the cartridge 11 can be taken out from the player housing by grasping a portion of the cartridge 11.

As described in the above, the guide roller 27 and 32 serve as a guide for the cartridge 11 when inserted and functions to securely position the cartridge 11 in the play position when moved to the play position.

The apparatus shown in FIG. 1 is arranged so that the lever member 18 is slidably supported by the substantially L-shaped guide or support members 19, 20 having the slot through which the lever member 18 passes. A modified form for supporting the lever member 18 is shown in FIG. 3 as will be fully described hereinafter.

Figure 3:
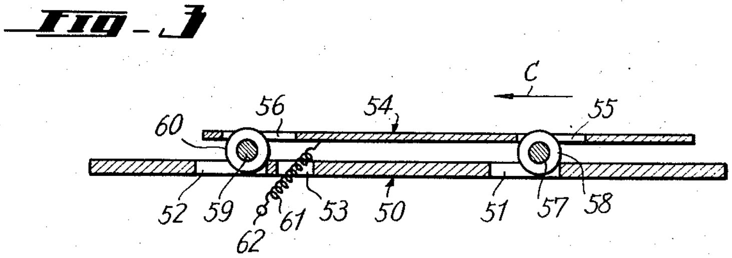
FIG. 3 is a cross-sectional view of a modified form of the reciprocating lever member used in the tape cartridge positioning apparatus.

In FIG. 3, numeral 50 indicates a deck similar to the deck 10 (FIG. 1), the deck 50 having two slots 51, 52 and a hole 53 in alignment therewith. Numeral 54 denotes a lever member which is corresponding to the lever member 18 (FIG. 1) and includes arms (not shown) similar to the rear and front arms 21, 22 (FIG. 1) and stepped portion (not shown) similar to the stepped portion 40. The lever member 54 also has two slots 55, 56 formed same as the slots 51 and 52. The lever member 54 is slidably mounted to space from the deck 50 by a roller 57 having a flange received in the slots 51, 55, and a roller 59 having a flange 60 received in the slots 52, 56. A spring 63 is at one end connected to a suitable support pin 62 mounted to the deck 50 at underside thereof and is at the other end coupled to the lever member 54 at a portion thereof upon passing through the hole 53 of the deck 50. The lever member 54 is downwardly urged by the spring 63. For this reason, upward movement of the lever member 54 with respect to the deck 50 is prevented by the bias of the spring 63.

As seen from the drawing, the spring 63 is slantly entrained between the pin 62 and the lever member 54 and exerts the movement force in the direction of arrow C to the lever member 54 in the same manner of the tension spring 35 (FIG. 1).

By slide movement of the lever member as the lever member 18 (FIG. 1), it is acted to move the cartridge inserted in the player housing, however, in this instance, it is more smoothly and slidably moved than the lever member 18 since the rollers 57, 59 are also moved therewith.

The invention and its attendant advantages will be understood from the foregoing description. It is to be understood that change and variations may be made without departing from the spirit and scope of the invention as defined in the appended claim.

What is claimed is:

1. A tape cartridge positioning apparatus for an endless magnetic tape cartridge player, the player including a player housing, a deck provided within the player housing, an opening formed on the player housing and adapted to receive laterally an endless magnetic tape cartridge in the player housing, a rotatable capstan mounted on the deck and adapted to drivingly transport an endless magnetic tape within the cartridge which is inserted through the opening into the player housing and positioned in a play position by the tape cartridge positioning apparatus, and at least one magnetic head mounted on the deck and adapted to transduce the tape within the cartridge in the play position, comprising:

a reciprocating lever member slidably mounted transversely of the direction that the cartridge is inserted, said lever member having a front arm opposed to a leading edge of the cartridge inserted into the player housing and a rear arm parallelly spaced and opposed to the front arm, said rear arm extending at its one end outwardly of the player housing and manually operated;

a tension spring for urging the lever member in one direction;

a stopper means for retaining the lever member against the bias of the tension spring in a first position where the cartridge to be inserted into the player housing is interposed between the front arm and the rear arm, said stopper means having a movable stopper lever mounted to the deck, said stopper lever being normally biased by a spring to a position to engage the lever member, one portion of said stopper lever being extended to the path of advancement of the cartridge to be inserted into the player housing when said stopper lever is biased by said spring to said position and being moved against the bias of said spring to a position to disengage the lever member in conjunction with depression of the stopper lever by the cartridge, the lever member being moved by the bias of the tension spring from the first position to the second position where the cartridge is positioned in the play position in conjunction with disengagement of said stopper lever from the lever member, the cartridge at its rear wall being pressed by the rear arm and brought to the play position in movement of the lever member by the tension spring;

a first guide member movably mounted to the rear arm, said first guide member being normally biased by a spring to a position where a portion of the cartridge is advanced, said first guide member being pressed by the rear wall of the cartridge when inserted and being moved against the bias of said spring and further adapted to press a side wall of the cartridge upon restoration by the bias of the spring when the cartridge is completely inserted;

a second guide member movably mounted to the deck and serving to guide the cartridge in cooperation with the first guide member in opposing to the leading edge of the cartridge when the cartridge is inserted, said second bias guide member being normally biased by a spring to guide the cartridge when inserted, said second guide member being adapted so that when the cartridge is moved to the play position with movement of the lever member, it is pressed by the cartridge and moved against the bias of said spring to press the side wall of the cartridge under the bias of said spring, the cartridge moved to the play position being positioned to the play position by the lever member, the first and second guide members, in conjunction with manually operated movement of the lever member from the second position to the first position, the leading edge of the cartridge in the play position is pressed by the front arm and moved back from the play position, and further being pressed outwardly of the player housing by the stopper lever in conjunction with restoration of the stopper lever to a position to engage the lever member.

2. Said apparatus in accordance with claim 1, wherein said second guide member is a roller rotatably provided to a lever pivotally mounted to said deck.

3. Said apparatus in accordance with claim 2, wherein said first guide member is a roller rotatably provided to a lever pivotally mounted to said rear arm of said lever member.

4. Said apparatus in accordance with claim 3, wherein said stopper means comprises said stopper lever pivotally mounted to said deck, a pin provided to the stopper lever, a stepped portion formed in said lever member for engaging the pin when said lever member is in said first position, and said spring for urging said stopper lever.

5. Said apparatus in accordance with claim 4, wherein said stopper lever includes a rotatable roller engageable with the cartridge when inserted.

6. Said apparatus in accordance with claim 5, wherein said rear arm of said lever member includes a knob adapted to be grasped by a portion projecting outwardly of said player housing.

7. Said apparatus in accordance with claim 1, wherein said lever member is slidably supported by rollers each having a flange receivable in slots arranged in alignment with said deck and slots arranged in alignment with the lever member.

8. Said apparatus in accordance with claim 7, wherein said lever member is given the biased force by said tension spring from said first position to said second position and the biased force in the direction toward said deck.

* * * * *